US012610436B2

(12) United States Patent
Teng

(10) Patent No.: US 12,610,436 B2
(45) Date of Patent: Apr. 21, 2026

(54) SINGLE-SOURCE MICROWAVE HEATING DEVICE

(71) Applicant: WAVE POWER TECHNOLOGY INC., Toufen City (TW)

(72) Inventor: Hsuan-Hao Teng, Toufen City (TW)

(73) Assignee: WAVE POWER TECHNOLOGY INC., Toufen City (TW)

( * ) Notice: Subject to any disclaimer, the term of this patent is extended or adjusted under 35 U.S.C. 154(b) by 832 days.

(21) Appl. No.: 17/849,910

(22) Filed: Jun. 27, 2022

(65) Prior Publication Data

US 2023/0345592 A1 Oct. 26, 2023

(30) Foreign Application Priority Data

Apr. 22, 2022 (TW) .................................. 111115506

(51) Int. Cl.
*H05B 6/70* (2006.01)
*H01P 1/18* (2006.01)
*H01P 3/12* (2006.01)

(52) U.S. Cl.
CPC ............... *H05B 6/707* (2013.01); *H01P 1/18* (2013.01); *H01P 3/12* (2013.01); *H05B 6/705* (2013.01)

(58) Field of Classification Search
CPC ... H01P 1/18; H01P 1/182; H01P 3/12; H05B 6/705; H05B 6/707
See application file for complete search history.

(56) References Cited

U.S. PATENT DOCUMENTS 5,410,283 A 4/1995 Gooray et al.
2006/0021980 A1 2/2006 Lee et al.
2017/0188417 A1 6/2017 Zhang et al.
2018/0323091 A1 11/2018 Rao et al.
2021/0000143 A1 1/2021 Druga et al.

FOREIGN PATENT DOCUMENTS

EP 0792085 A2 8/1997
TW 201907506 A 2/2019

OTHER PUBLICATIONS

Candice Ellison et al., "Investigation of microwave-assisted pyrolysis of biomass with char in a rectangular waveguide applicator with built-in phase-shifting", 2019, 34 pages, Applied Energy 259 (2020): 114217, Elsevier, https://www.sciencedirect.com/science/article/pii/S030626191931904X.

*Primary Examiner* — Steven W Crabb
*Assistant Examiner* — Dilnessa B Belay
(74) *Attorney, Agent, or Firm* — Best & Flanagan LLP

(57) ABSTRACT

A single-source microwave heating device has a first power-divider, a microwave emitting module and a shifting wave channel. An input port and an isolated port are located on one side of the first power-divider. Two output ports are located on an opposite side of the first power-divider. The microwave emitting module is connected to the input port. The first power-divider divides a microwave from the microwave emitting module between the two output ports. Two ends of the shifting wave channel are each connected to a respective one of the two output ports. A first phase-shifting module and a standing-wave heating chamber are serially mounted along the shifting wave channel. A phase-shift provided by the first phase-shifting module varies according to a position of the first phase-adjusting assembly such that positions of standing-wave crests in the standing-wave heating chamber can be moved back and forth to achieve uniform heating.

8 Claims, 10 Drawing Sheets

SINGLE-SOURCE MICROWAVE HEATING DEVICE

BACKGROUND OF THE INVENTION

1. Field of the Invention

The present invention relates to a heating device using microwaves, especially to a standing-wave type microwave heater.

2. Description of the Prior Arts

Conventional microwave heaters fall into two main groups: standing-wave type microwave heater and traveling-wave type heater. The standing-wave type microwave heater has a resonant chamber where microwaves resonate to form standing waves. An object to be heated is placed in the resonant chamber or pass through the resonant chamber where the object to be heated absorbs microwave energy and is heated up. However, standing waves form hot spots and cold spots that are fixed in space in the resonant chamber, making it difficult to heat the object uniformly.

The traveling-wave type heaters do not form significant hot spots and cold spots, and therefore it is possible for the traveling-wave type heaters to heat up low microwave-absorbing material uniformly. However, when heating up high microwave-absorbing material, microwave energy is absorbed by a part of the object to be heated that is closer to a microwave emitting module; leaving another part of the object to be heated that is farther from the microwave emitting module insufficiently heated. In summary, the conventional traveling-wave type heaters still cannot achieve uniform heating.

To overcome the shortcomings, the present invention provides a single-source microwave heating device to mitigate or obviate the aforementioned problems.

SUMMARY OF THE INVENTION

The main objective of the present invention is to provide a single-source microwave heating device in which a standing wave is formed in a microwave channel conventionally used for propagating travelling waves, and positions of hot spots resulting from said standing wave is controllable to achieve uniform heating.

A single-source microwave heating device is configured to heat up an object to be heated. The single-source microwave heating device comprises a first power-divider, a microwave emitting module, and a shifting wave channel. The first power-divider has an input port, an isolated port, and two output ports. Two opposite sides of the first power-divider are respectively an input side and an output side. The input port and the isolated port are located on the input side; and the two output ports are located on the output side. The microwave emitting module is configured to emit a microwave into the first power-divider via the input port. The first power-divider divides the microwave from the microwave emitting module between the two output ports according to a main divide ratio, and emits the divided microwaves from the two output ports. Each of two opposite ends of the shifting wave channel is connected to a respective one of the two output ports of the first power-divider. A first phase-shifting module and a standing-wave heating chamber are serially disposed in and along the shifting wave channel. The first phase-shifting module is configured to shift a phase of a microwave passing through the first phase-shifting module. The first phase-shifting module has a first phase-adjusting assembly and a first driving assembly. A phase-shift provided by the first phase-shifting module varies according to a position of the first phase-adjusting assembly. The first driving assembly controls the position of the first phase-adjusting assembly. The standing-wave heating chamber is configured to accommodate the object to be heated. The microwaves emitted from the two output ports of the first power-divider interfere to form a standing wave in the shifting wave channel. Positions of crests of the standing wave in the shifting wave channel vary according to the position of the first phase-adjusting assembly. The standing wave in the shifting wave channel is absorbed by the object to be heated in the standing-wave heating chamber to heat up the object.

A single-source microwave heating device is configured to heat up an object to be heated. The single-source microwave heating device comprises a first power-divider, a microwave emitting module, a shifting wave channel, and a circulating wave channel. The first power-divider has an input port, an isolated port, and two output ports; two opposite sides of the first power-divider are respectively an input side and an output side. The input port and the isolated port are located on the input side. The two output ports are located on the output side. The microwave emitting module is configured to emit a microwave into the first power-divider via the input port. The first power-divider divides the microwave from the microwave emitting module between the two output ports according to a main divide ratio, and emits the divided microwave from the two output ports. Each of two opposite ends of the shifting wave channel is connected to a respective one of the two output ports of the first power-divider. A first phase-shifting module and a second power-divider are serially disposed in and along the shifting wave channel. The first phase-shifting module is configured to shift a phase of a microwave passing through the first phase-shifting module. The first phase-shifting module has a first phase-adjusting assembly and a first driving assembly. A phase-shift provided by the first phase-shifting module varies according to a position of the first phase-adjusting assembly. The first driving assembly controls the position of the first phase-adjusting assembly. The second power-divider has a first port, a second port, a third port, and a fourth port; two opposite sides of the second power-divider are respectively a first side and a second side. The first port and the second port are located on the first side. The third port and the fourth port are located on the second side. The second power-divider divides a microwave entering the first port according to a first divide ratio and emits the divided microwaves from the third port and the fourth port. The second power-divider divides a microwave entering the second port according to a second divide ratio and emits the divided microwaves from the third port and the fourth port. The second power-divider divides a microwave entering the third port according to a third divide ratio and emits the divided microwaves from the first port and the second port. The second power-divider divides a microwave entering the fourth port according to a fourth divide ratio and emits the divided microwaves from the first port and the second port. A channel between the first port and the fourth port of the second power-divider forms a section of the shifting wave channel. The second port and the third port of the second power-divider are connected to two opposite ends of the circulating wave channel respectively. A second phase-shifting module and a standing-wave heating chamber are serially disposed in and along the circulating wave channel. The second phase-shifting module is configured to shift a phase of a microwave passing through the second phase-shifting module. The second phase-shifting module has a second phase-adjusting assembly and a second driving assembly. A phase-shift provided by the second phase-shifting module varies according to a position of the second phase-adjusting assembly; the second driving assembly controls the position of the second phase-adjusting assembly. The standing-wave heating chamber is configured to accommodate the object to be heated. The microwaves emitted from the two output ports of the first power-divider interfere to form a standing wave in the circulating wave channel; positions of crests of the standing wave in the circulating wave channel vary according to the position of the first phase-adjusting assembly. The standing wave in the circulating wave channel is absorbed by the object to be heated in the standing-wave heating chamber to heat up the object. When the second phase-adjusting assembly of the second phase-shifting module is moved to a phase-inverting position, a phase of a microwave, which enters the second power-divider via the second port, leaving from the fourth port is inverted relative to a phase of another microwave, which enters the second power-divider via the first port, leaving from the fourth port. Meanwhile a phase of a microwave, which enters the second power-divider via the third port, leaving from the first port is inverted relative to a phase of another microwave, which enters the second power-divider via the fourth port, leaving from the first port.

During operation, a microwave emitted by the microwave emitting module is divided to the two output ports of the first power-divider. A microwave leaving from one of the output ports directly enters the standing-wave heating chamber via one end thereof; meanwhile, another microwave leaving from the other one of the output ports passes through the first phase-shifting module before entering the standing-wave heating chamber via an opposite end thereof. As a result, the two microwaves from the two output ports interfere in the standing-wave heating chamber and form a standing wave.

The advantage of the present invention is that the first driving assembly is capable of moving the first phase-adjusting assembly back and forth such that a phase of the microwave passing through the first phase-shifting module varies repeatedly, thereby moving positions of the crests (hot spots) of the standing wave back and forth to achieve uniform heating.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
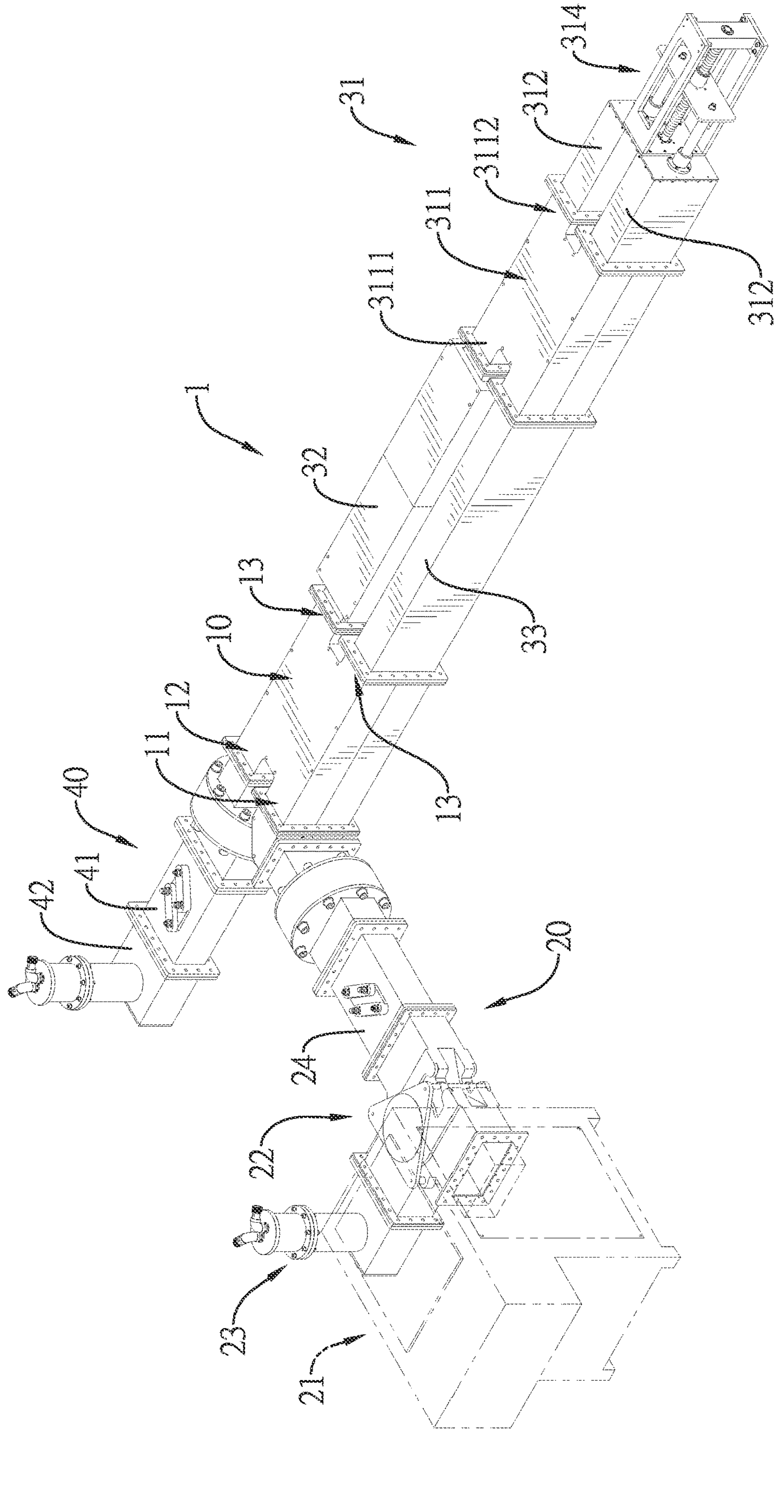
FIG. 1 is a perspective view of a first embodiment of a single-source microwave heating device in accordance with the present invention.
Figure 2:
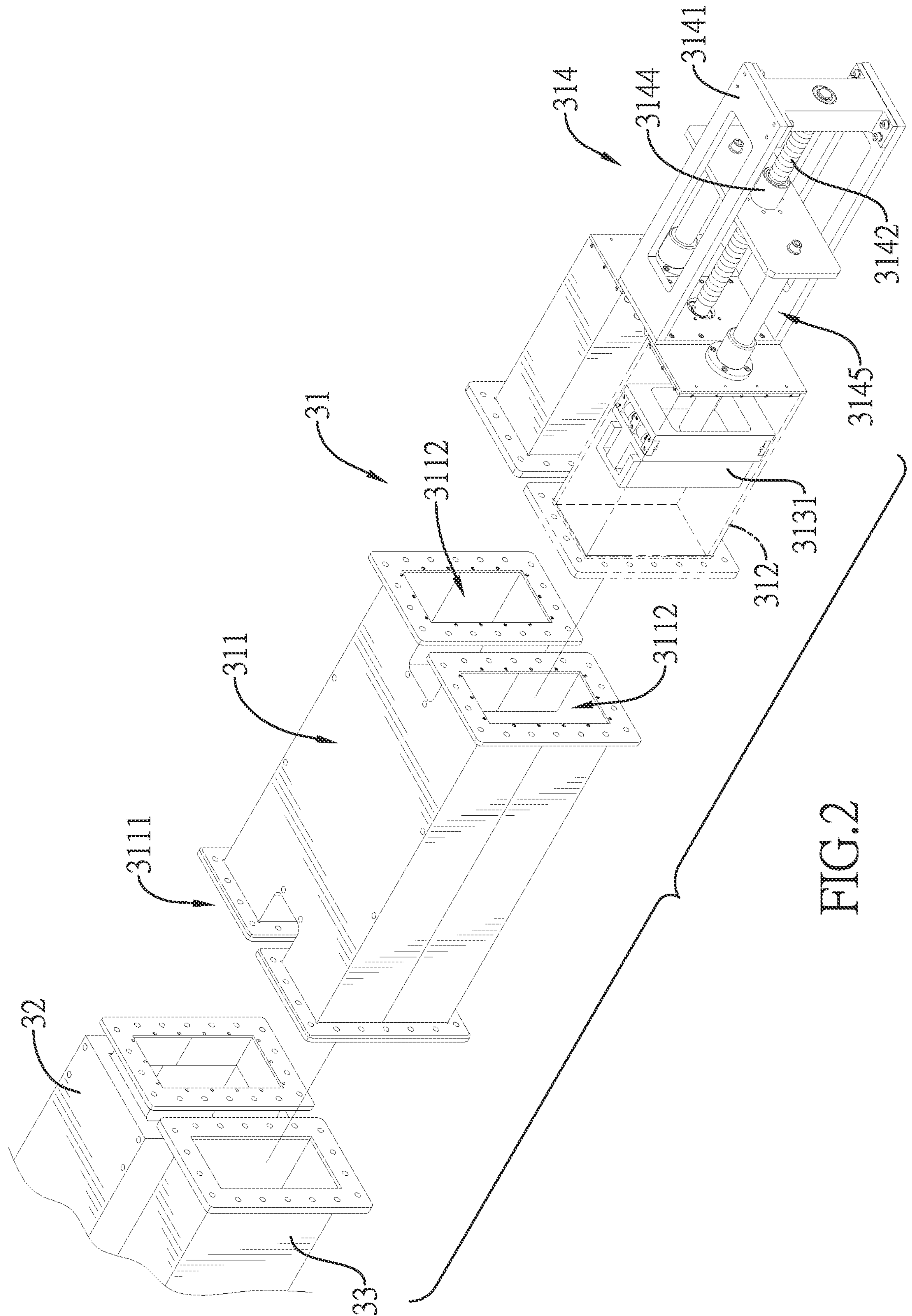
FIG. 2 is a partial exploded perspective view of the single-source microwave heating device in FIG. 1.
Figure 3:
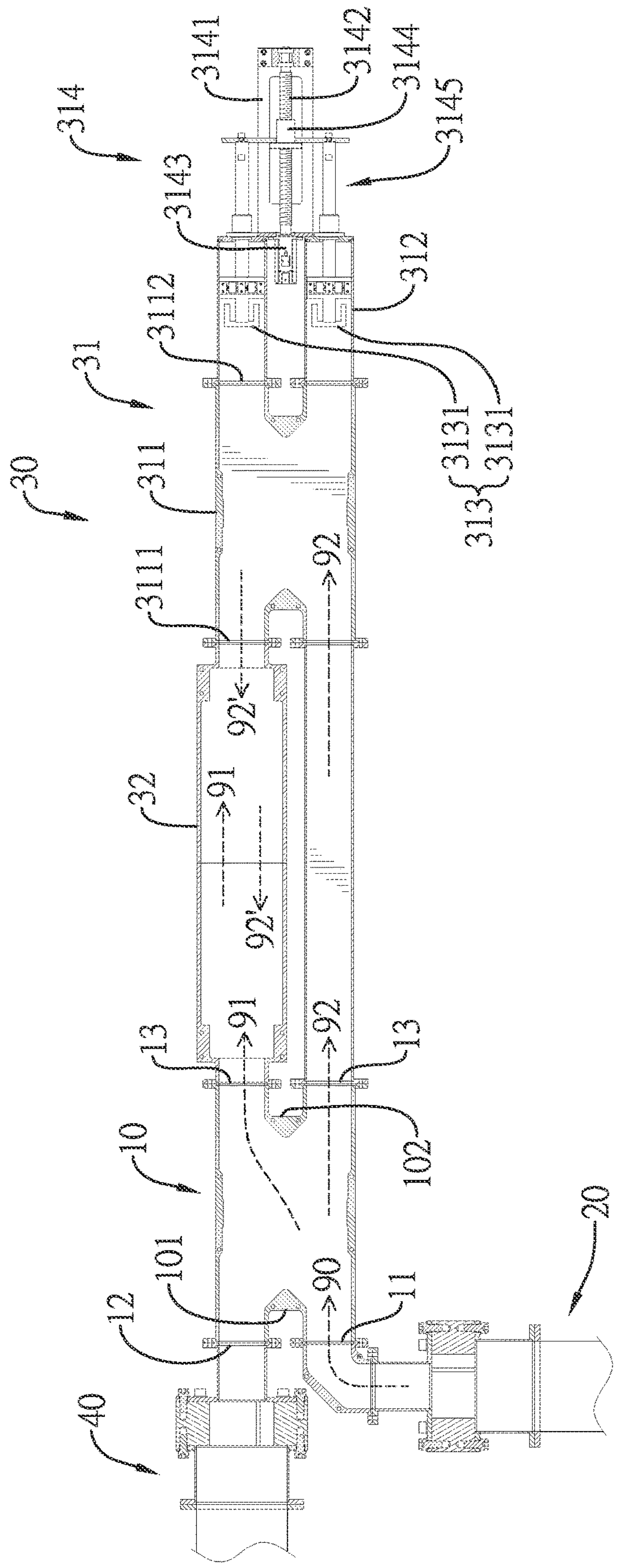
FIG. 3 is a sectional view of the single-source microwave heating device in FIG. 1.

With reference to FIGS. 1 to 3, a first embodiment of a single-source microwave heating device 1 (as shown in FIG. 1) in accordance with the present invention is configured to heat up an object A to be heated. The heating device 1 comprises a first power-divider 10, a microwave emitting module 20, and a shifting wave channel 30. In the preferred embodiment, the heating device 1 further comprises an isolated-port load assembly 40.

The first power-divider 10 has an input port 11, an isolated port 12 and two output ports 13. Two opposite sides of the first power-divider 10 are respectively an input side 101 (as shown in FIG. 3) and an output side 102 (as shown in FIG. 3). The input port 11 and the isolated port 12 are located on the input side 101, while the two output ports 13 are located on the output side 102. In short, the two output ports 13 are disposed opposite to the input port 11 and the isolated port 12.

The first power-divider 10 is preferably a 3-dB directional coupler, which is also called a four-port power-divider. The S-matrix for an ideal 3-dB directional coupler is as follows:

$$S_{3dB} = 1/\sqrt{2}\begin{bmatrix} 0 & 1 & \pm j & 0 \\ 1 & 0 & 0 & \pm j \\ \pm j & 0 & 0 & 1 \\ 0 & \pm j & 1 & 0 \end{bmatrix};$$

That is, when a microwave enters the first power-divider 10 via the input port 11 or the isolated port 12 on the input side 101, the first power-divider 10 divides said microwave equally between the two output ports 13 on the output side 102 and emitting the divided microwaves from the two output ports 13. On the other hand, when a microwave is reflected and enters the first power-divider 10 via any one of the output ports 13, the first power-divider 10 divides said microwave equally between the input port 11 and isolated port 12. As a result, the first power-divider 10 is theoretically lossless when dividing the microwave. In the preferred embodiment, the first power-divider 10 is an H-shaped hollow casing; the input port 11, the isolated port 12, and the two output ports 13 are respectively four ends of the first power-divider 10.

The microwave emitting module 20 emits a microwave into the first power-divider 10 via the input port 11. The first power-divider 10 divides the microwave from the microwave emitting module 20 between the two output ports 13 according to a main divide ratio, and then emits the divided microwaves from the two output ports 13.

In the preferred embodiment, the first power-divider 10 is a 3-dB directional coupler as mentioned above, and therefore the microwave entering the input port 11 is equally divided between the two output ports 13; that is, the main divide ratio is 1:1.

In the preferred embodiment, the microwave emitting module 20 has a microwave source 21 (as shown in FIG. 1), a circulator 22 (as shown in FIG. 1), a water load 23 (as shown in FIG. 1), and a first directional coupler 24 (as shown in FIG. 1). The microwave source 21 is configured to generate a microwave; the circulator 22 allows the microwave to travel from the microwave source 21 to the first power-divider 10. When the microwave travels in reverse; that is, when the microwave travels from the first power-divider 10 to the microwave source 21, the circulator 22 directs the reversed microwave to the water load 23 to protect the microwave source 21. The first directional coupler 24 is configured to measure a microwave energy leaving from the input port 11 and travelling toward the water load 23.

Each of two opposite ends of the shifting wave channel 30 is connected to a respective one of the two output ports 13 of the first power-divider 10. A first phase-shifting module 31 and a standing-wave heating chamber 32 are serially disposed in and along the shifting wave channel 30.

To be precise, the shifting wave channel 30 is formed by serially connecting a waveguide 33, a first phase-shifting module 31, and a standing-wave heating chamber 32. One end of the first phase-shifting module 31 is connected to an end of the waveguide 33, and another end of the first phase-shifting module 31 is connected to an end of the standing-wave heating chamber 32. Another end of the waveguide 33 is connected to one of the output ports 13 of the first power-divider 10; another end of the standing-wave heating chamber 32 is connected to the other one of the output ports 13.

Figure 4A:
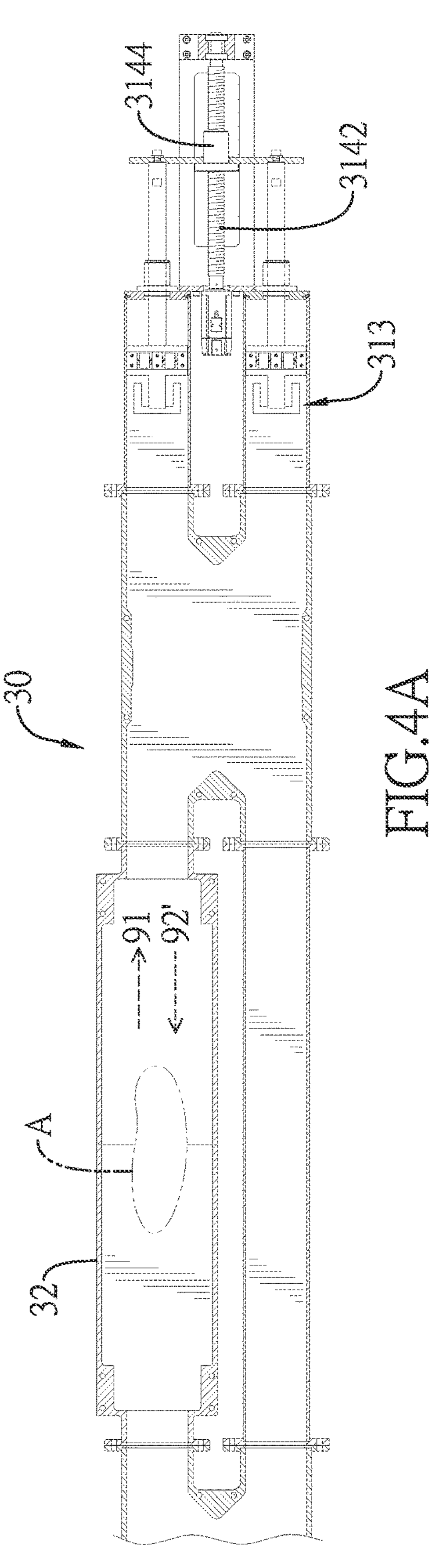
FIG. 4A is an enlarged sectional view of the single-source microwave heating device in FIG. 1.
Figure 4B:
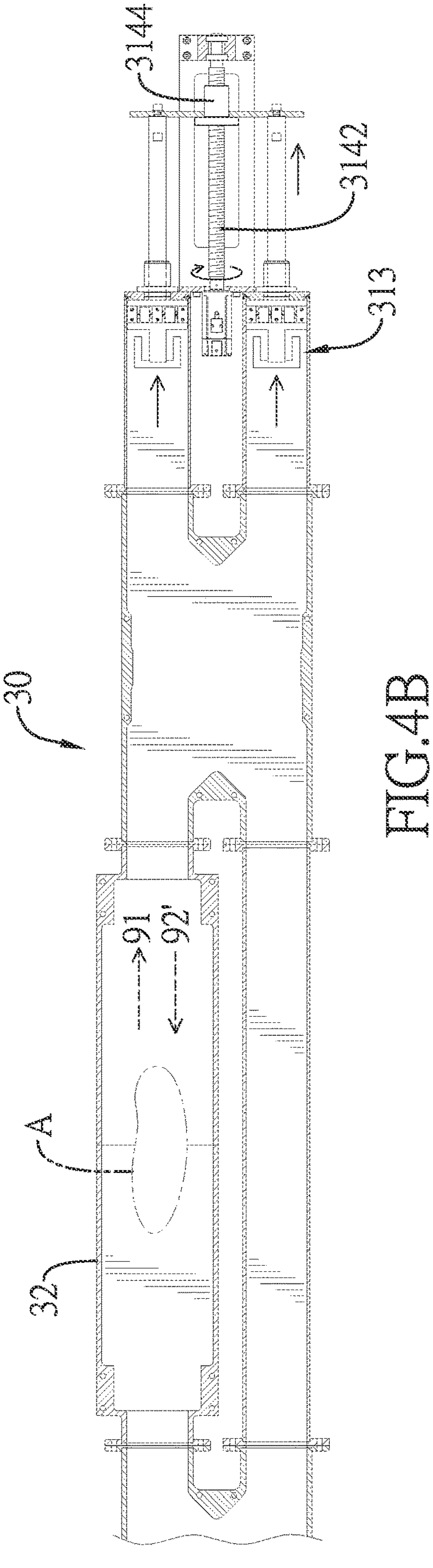
FIG. 4B is another enlarged sectional view of the single-source microwave heating device in FIG. 1, showing a position of a first phase-adjusting assembly of a first phase-shifting module being moved.
Figure 5A:
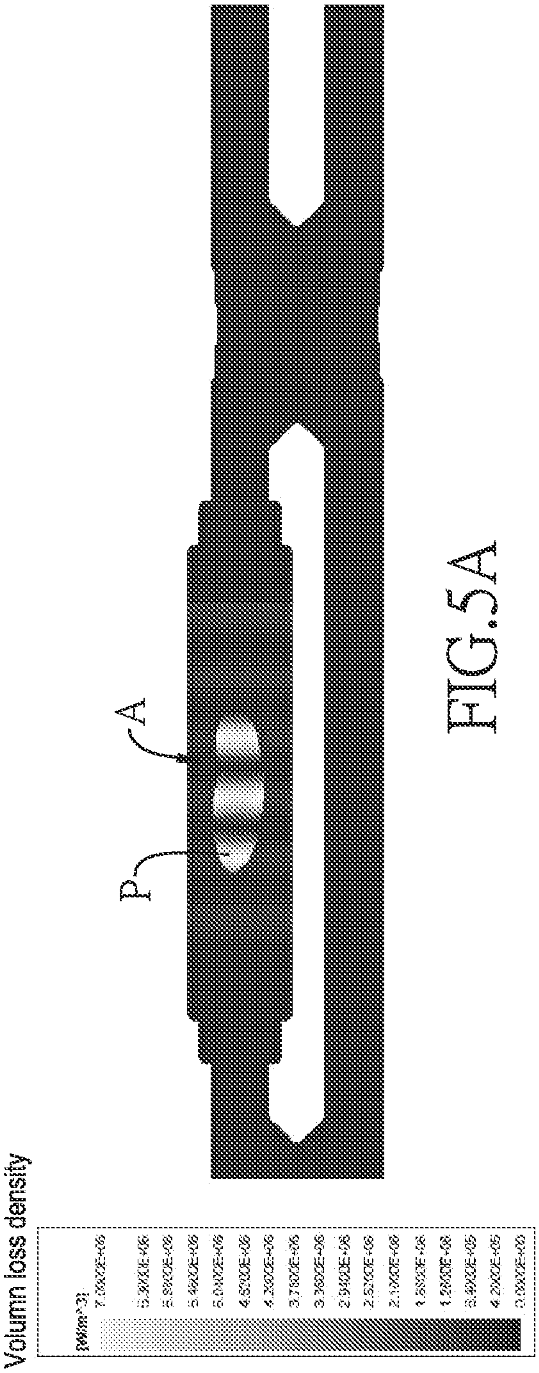
FIG. 5A is an analysis diagram showing volume loss density of microwave energy of the single-source microwave heating device in FIG. 4A.
Figure 5B:
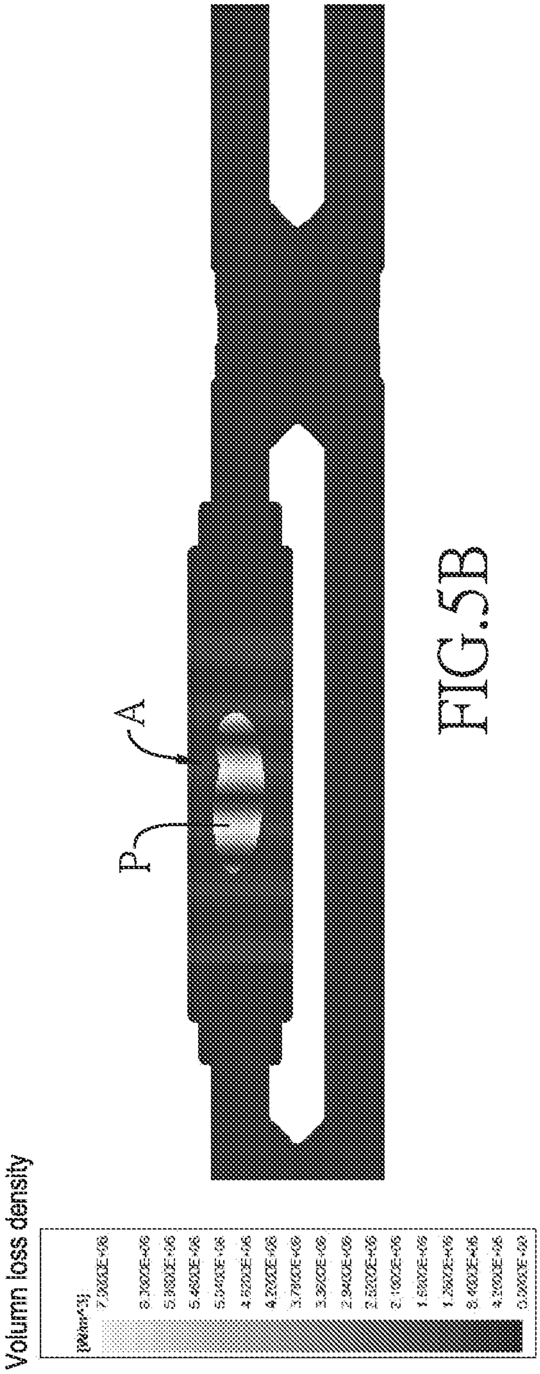
FIG. 5B is an analysis diagram showing volume loss density of the microwave energy of the single-source microwave heating device in FIG. 4B, showing positions of standing-wave crests changing according to position of the first phase-adjusting assembly.

With reference to FIGS. 3, 4A and 4B, the first phase-shifting module 31 is configured to shift a phase of a microwave passing through the first phase-shifting module 31. The first phase-shifting module 31 preferably has a shifter main body 311, two waveguides 312, a first phase-adjusting assembly 313, and a first driving assembly 314.

The shifter main body 311 is a power-divider which is substantially same as the first power-divider 10 in terms of structure. The shifter main body 311 has two wave-guiding ports 3111 and two control ports 3112. Two opposite sides of the shifter main body 311 are respectively a wave-guiding side and a control side, wherein the two wave-guiding ports 3111 are located on the wave-guiding side, and the two control ports 3112 are located on the control side. In the preferred embodiment, the first phase-shifting module 31 shifts a phase of a microwave passing through the shifter main body 311 via the two wave-guiding ports 3111.

One of the wave-guiding ports 3111 is connected to the end, which is opposite to the first power-divider 10, of the waveguide 33. The other one of the wave-guiding ports 3111 is connected to the standing-wave heating chamber 32 such that microwaves in the shifting wave channel 30 pass through the shifter main body 311 via the two wave-guiding ports 3111; that is, a channel between two wave-guiding ports 3111 of the shifter main body 311 forms a section of the shifting wave channel 30.

Each of the two waveguides 312 is connected to a respective one of the two control ports 3112 of the shifter main body 311. In another preferred embodiment, the two waveguides 312 and the shifter main body 311 are integrally formed.

The first phase-adjusting assembly 313 preferably comprises two shorting pistons 3131. The two shorting pistons 3131 are each slidably disposed in a respective one of the two waveguides 312, and the two shorting pistons 3131 preferably move synchronously. The shorting pistons 3131 are configured to reflect microwave energy in the waveguides 312. Changing positions of the two shorting pistons 3131 increases or decreases travelling-length for microwaves, and therefore changing a phase-shift provided by the first phase-shifting module 31; that is, the phase-shift provided by the first phase-shifting module 31 varies according to a position of the first phase-adjusting assembly 313.

The first driving assembly 314 controls the position of the first phase-adjusting assembly 313. In the preferred embodiment, the first driving assembly 314 comprises a connecting seat 3141, a driving screw 3142, a motor 3143, a driving nut 3144, and a connecting part 3145.

The connecting seat 3141 is fixed relative to the two waveguides 312 of the first phase-shifting module 31. To be specific, the connecting seats 3141 are fixed on the two waveguides 312. The driving screw 3142 is rotatably mounted on the connecting seat 3141. The motor 3143 is mounted on the connecting seat and rotates the driving screw 3142. The connecting part 3145 is fixed to the driving nut 3144, is non-rotatable relative to the connecting seat 3141, and is connected to the two shorting pistons 3131.

In the preferred embodiment, the connecting part 3145 has a plate and two guide shafts. The plate is fixed to the driving nut 3144 and is non-rotatable relative to the connecting seat 3141. The two guide shafts are slidably mounted through the plate, and the two guide shafts are each connected to a respective one of the two shorting pistons 3131. When the motor 3143 rotates the driving screw 3142, the driving nut 3144 is driven by the driving screw 3142 to move along a lengthwise direction of the driving screw 3142, thereby moving the two shorting pistons 3131 via the plate and two guide shafts of the connecting part 3145. As a result, the first driving assembly 314 is capable of controlling the positions of the two shorting pistons 3131.

In the preferred embodiment, the first phase-shifting module 31 is an adjustable phase-shifter substantially assembled by a 3-db directional coupler (the shifter main body 311), the two shorting pistons 3131, and the first driving assembly 314, but the first phase-shifting module 31 is not limited thereto. The first phase-shifting module 31 can be other kinds of adjustable phase-shifter as long as the first phase-shifting module 31 has the first driving assembly 314 and the first phase-adjusting assembly 313, and the first driving assembly 314 actively controls the position of the first phase-adjusting assembly 313 to change the phase-shift provided by the first phase-shifting module 31.

The standing-wave heating chamber 32 is configured to accommodate the object A to be heated. The object A to be heated is any object that is capable of absorbing microwave energy and being heated up by the energy such that the present invention can function as a heater or dryer. An access opening (not shown in figures) is preferably formed through a side wall of the standing-wave heating chamber 32 for placing or removing the object A to be heated.

The isolated-port load assembly 40 has a second directional coupler 41 (as shown in FIG. 1) and a water load 42 (as shown in FIG. 1) that are serially connected to the first power-divider 10. The second directional coupler 41 is mounted to the isolated port 12 of the first power-divider 10 and configured to measure a microwave energy leaving from the isolated port 12 and travelling toward the water load 42.

When the present invention is in use, the microwave emitting module 20 generates a microwave 90, and then the microwave 90 is equally divided by the first power-divider 10 into a forward microwave 91 and a backward microwave 92. The forward microwave 91 directly enters the standing-wave heating chamber 32 via one of the output ports 13, while the backward microwave 92 passes through the other one of the output ports 13, the waveguide 33, and the first phase-shifting module 31 before entering the standing-wave heating chamber 32. The backward microwave 92 becomes backward microwave 92' after passing through the first phase-shifting module 31 where a phase of the backward microwave 92 is shifted. The forward microwave 91 and the backward microwave 92' travel toward each other and interfere in the standing-wave heating chamber 32 to form a standing wave.

With reference to FIGS. 4A, 4B, 5A, and 5B, to achieve uniform heating, the first driving assembly 314 changes the positions of the two shorting pistons 3131 of the first phase-adjusting assembly 313 such that a phase of the backward microwave 92' is shifted, thereby changing positions of standing-wave-crests P in the standing-wave heating chamber 32.

Because positions of the standing-wave-crests P are hot spots of the object A to be heated, the object A to be heated can be more evenly heated up by changing positions of standing-wave-crests P. In the preferred embodiment, the first driving assembly 314 of the first phase-shifting module 31 drives the two shorting pistons 3131 of the first phase-adjusting assembly 313 to move back and forth continuously to achieve uniform heating.

With reference to FIGS. 1 and 3, although the first embodiment is capable of achieving uniform heating, the forward microwave 91 and the backward microwave 92' are absorbed by the water load 23 of the first power-divider 10 and the water load 42 of the isolated-port load assembly 40 and turned into waste heat if said microwaves are not fully absorbed by the object A to be heated during first pass. Therefore, when the object A to be heated is low microwave-absorbing material, most of the microwaves 90 is turned into waste heat instead of heating up the object A, resulting in a poor heating efficiency.

Figure 6:
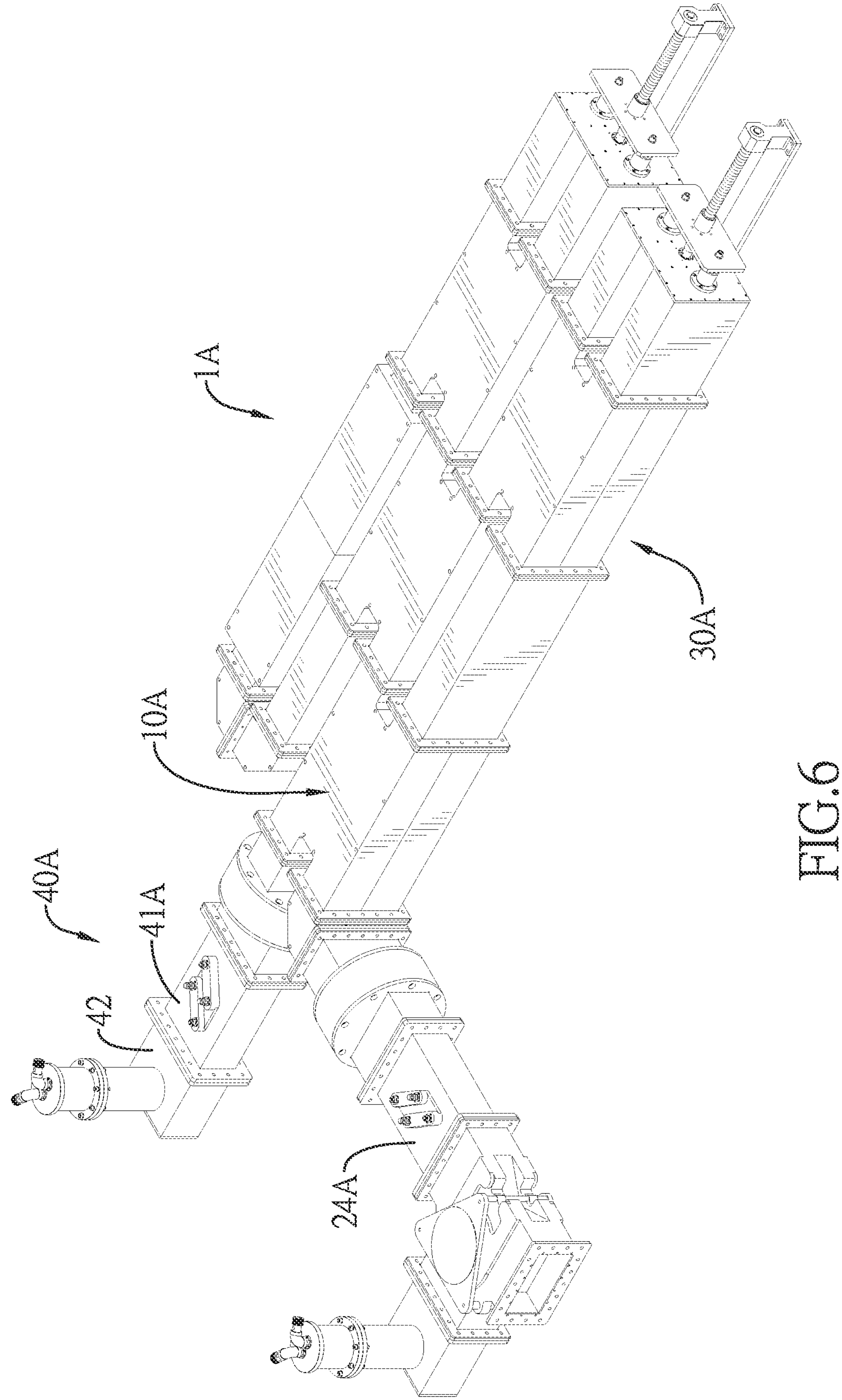
FIG. 6 is a perspective view of a second embodiment of a single-source microwave heating device in accordance with the present invention.
Figure 7:
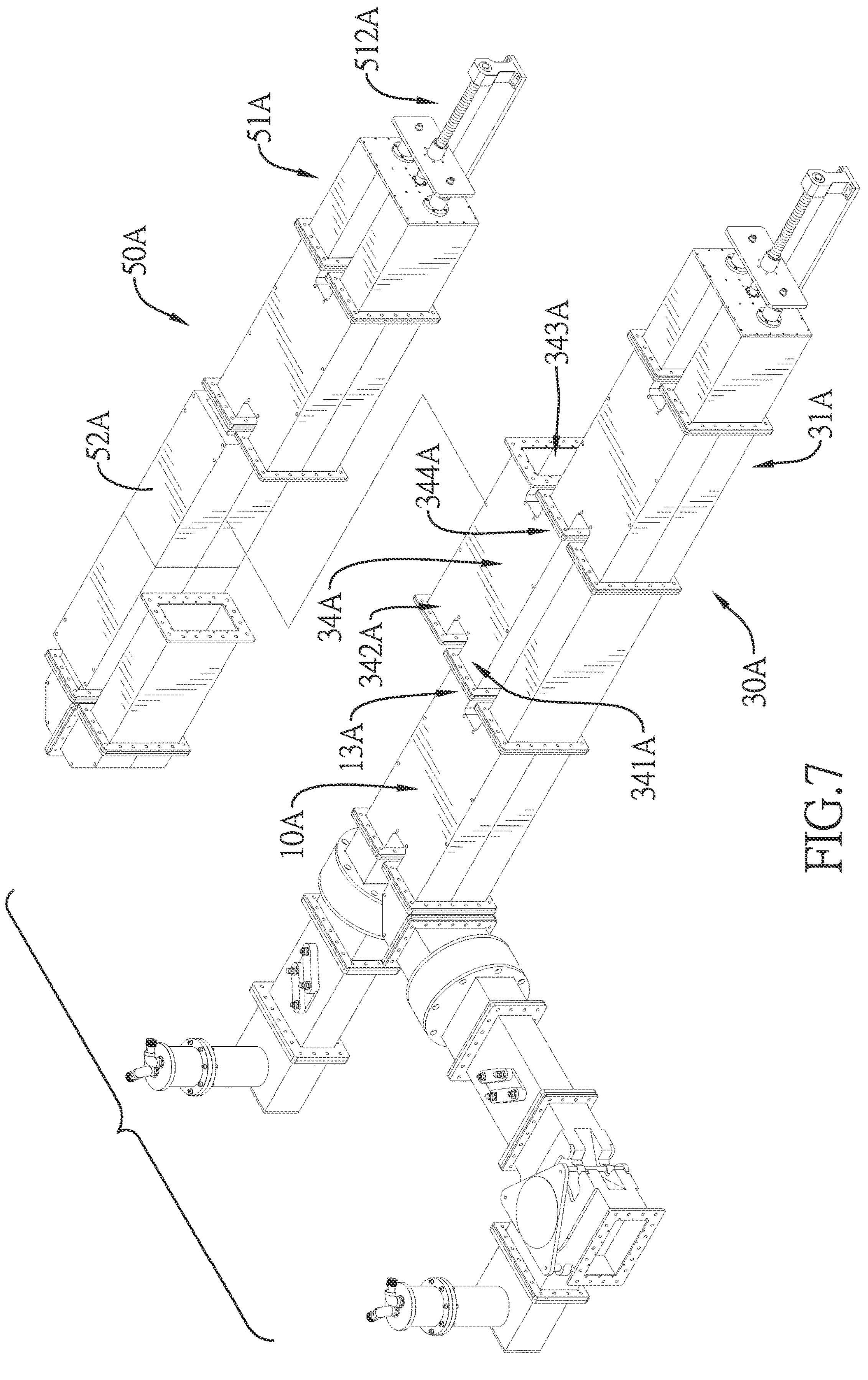
FIG. 7 is a partial exploded perspective view of the single-source microwave heating device in FIG. 6.
Figure 8:
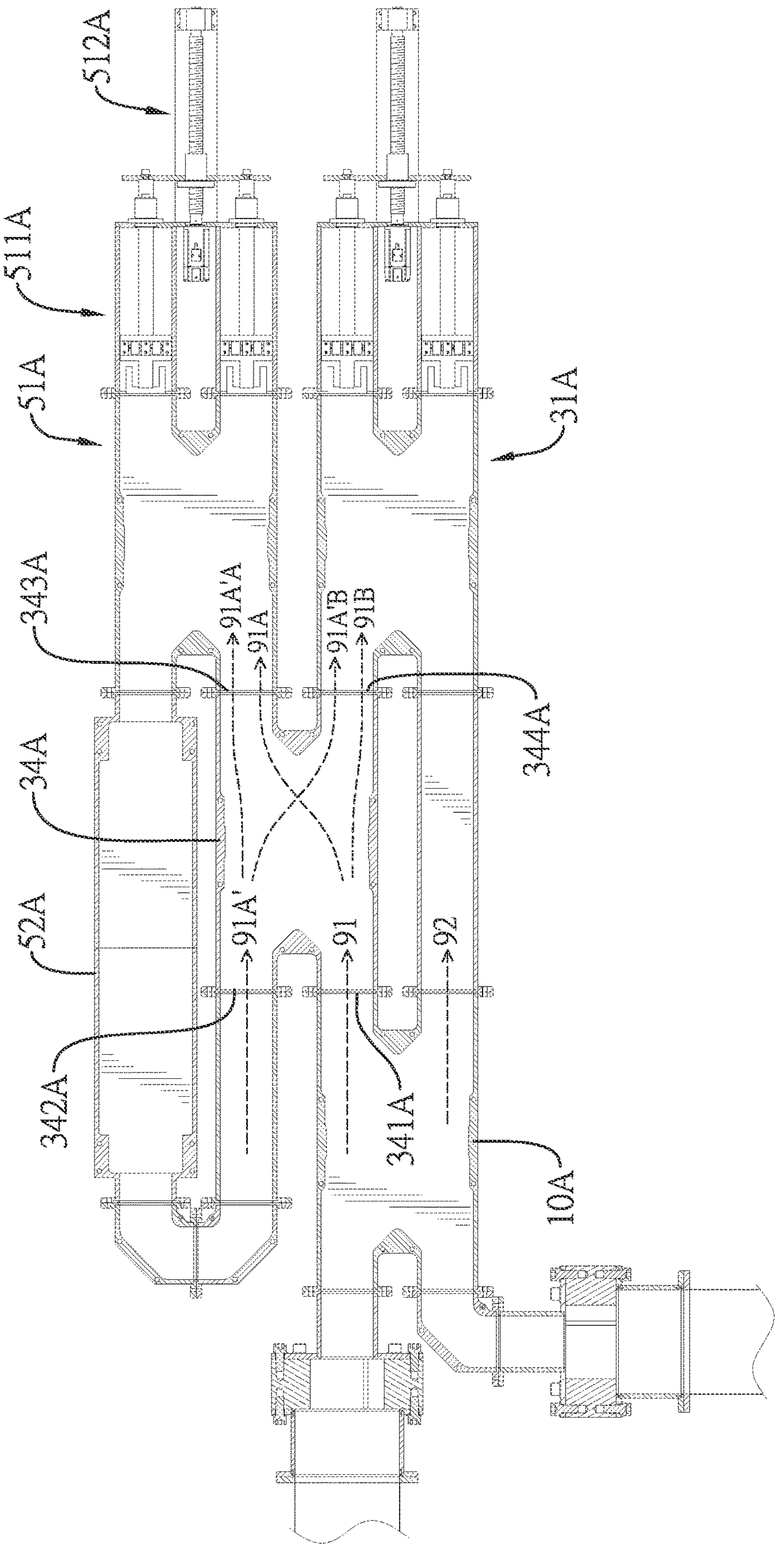
FIG. 8 is a sectional view of the single-source microwave heating device in FIG. 6.

With reference to FIGS. 6 to 8, a second embodiment of the single-source microwave heating device 1A in accordance with the present invention further comprises a circulating wave channel 50A and the shifting wave channel 30A is modified such that microwaves in the shifting wave channel 30A are capable of entering and circulating in the circulating wave channel 50A. The object A to be heated is moved to the circulating wave channel 50A such that microwaves that are not absorbed by the object A to be heated in the first pass can repeatedly pass through and be absorbed by the object A to be heated, thereby greatly improving the heating efficiency when the object A to be heated is low microwave-absorbing material.

The shifting wave channel 30A is different from the first embodiment by replacing the standing-wave heating chamber 32 in the shifting wave channel 30 by a second power-divider 34A.

The second power-divider 34A is mounted between the first phase-shifting module 31A of the shifting wave channel 30A and the first power-divider 10A. The second power-divider 34A has a first port 341A, a second port 342A, a third port 343A, and a fourth port 344A. Two opposite sides of the second power-divider 34A are respectively a first side and a second side. The first port 341A and the second port 342A are located on the first side, while the third port 343A and the fourth port 344A are located on the second side. In short, the first port 341A and the second port 342A are disposed opposite to the third port 343A and the fourth port 344A.

On the first side of the second power-divider 34A, the second power-divider 34A divides a microwave entering the first port 341A between the third port 343A and the fourth port 344A according to a first divide ratio, and emits the divided microwaves from the third port 343A and the fourth port 344A. Likewise, the second power-divider 34A divides a microwave entering the second port 342A between the third port 343A and the fourth port 344A according to a second divide ratio, and emits the divided microwaves from the third port 343A and the fourth port.

On the second side of the second power-divider 34A, the second power-divider 34A divides a microwave entering the third port 343A between the first port 341A and the second port 342A according to a third divide ratio and emits the divided microwaves from the third port 343A and the fourth port 344A, and emits the divided microwaves from the first port 341A and the second port 342A. Likewise, the second power-divider 34A divides a microwave entering the fourth port 344A between the first port 341A and the second port 342A according to a fourth divide ratio and emits the divided microwaves from the third port 343A and the fourth port 344A, and emits the divided microwaves from the first port 341A and the second port 342A.

In the preferred embodiment, the second power-divider 34A and the first power-divider 10A are each a 3-dB power divider; therefore, the microwave entering the first port 341A or the second port 342A is equally divided between the third port 343A and the fourth port 344A. Likewise, the microwave entering the third port 343A or the fourth port 344A is equally divided between the first port 341A and the second port 342A. That is, the first divide ratio, the second divide ratio, the third divide ratio, and the fourth divide ratio are all 1:1.

A channel between the first port 341A and the fourth port 344A of the second power-divider 34A forms a section of the shifting wave channel 30A. To be precise, the first port 341A is an end of the shifting wave channel 30A and connected to one of the two output ports 13A of the first power-divider 10A. The fourth port 344A is connected to the first phase-shifting module 31A.

The second port 342A and the third port 343A of the second power-divider 34A are connected to a respective one of two ends of the circulating wave channel 50A respectively. The second power-divider 34A directs the microwaves in the shifting wave channel 30A into the circulating wave channel 50A.

A second phase-shifting module 51A and a standing-wave heating chamber 52A are serially disposed in and along the circulating wave channel 50A. The second phase-shifting module 51A is configured to shift a phase of a microwave passing through the second phase-shifting module 51A. The second phase-shifting module 51A has a second phase-adjusting assembly 511A and a second driving assembly 512A. A phase-shift provided by the second phase-shifting module 51A varies according to a position of the second phase-adjusting assembly 511A. The second driving assembly 512A controls the position of the second phase-adjusting assembly 511A.

In the preferred embodiment, structure of the second phase-shifting module 51A is substantially same as structure of the first phase-shifting module 31. The phase-shift of each of the second phase-shifting modules 51A is also controlled by a driving screw which is driving by a motor; detailed description of the second phase-shifting module 51A is omitted.

The standing-wave heating chamber 52A is configured to accommodate the object A to be heated. The standing-wave heating chamber 52A is, but not limited to, a rectangular tube.

Figure 9:
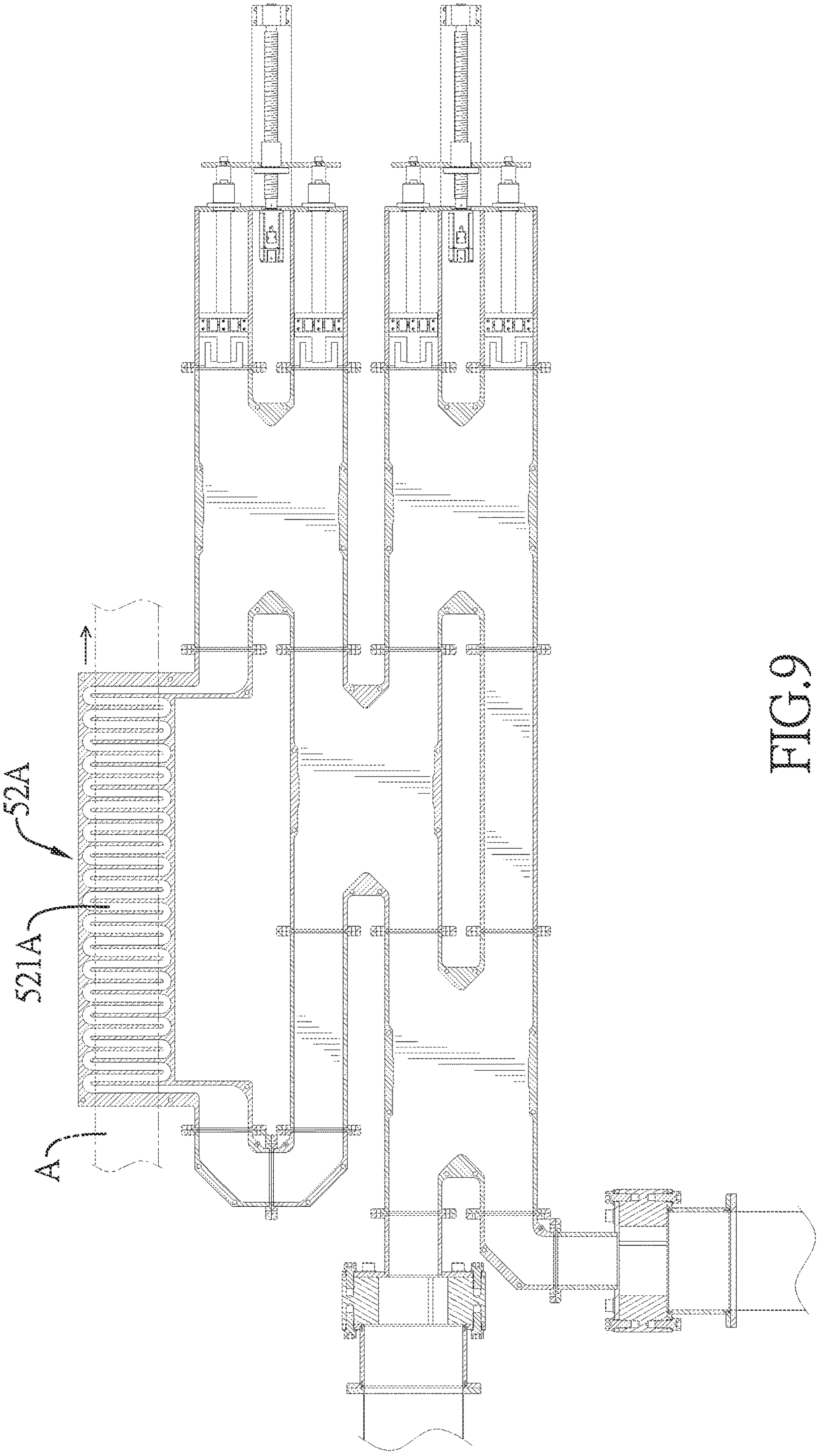
FIG. 9 is a sectional view of a third embodiment of a single-source microwave heating device in accordance with the present invention.

With reference to FIG. 9, the object A to be heated in a third embodiment in accordance with the present invention is an elongated thin-film used in a roll-to-roll process. In order to process the elongated thin-film, a microwave heating channel 521A is formed in the standing-wave heating chamber 52A. The microwave heating channel 521A zigzags back and forth in the standing-wave heating chamber 52A to form a meandering channel. The object A to be heated passes through the microwave heating channel 521A via a slot (not shown in figures) formed through the standing-wave heating chamber 52A.

With reference to FIGS. 3 and 8, one of the differences between the second embodiment and the first embodiment is that the microwave 90 generated by the microwave emitting module 20A is directed into the circulating wave channel 50A, and when the second phase-adjusting assembly 511A of the second phase-shifting module 51A is moved to a phase-inverting position, the circulating wave channel 50A enters a special circulating state in which more microwaves are directed from the shifting wave channel 30A into the circulating wave channel 50A by the second power-divider 34A, while less microwaves are allowed to return to the shifting wave channel 30A from the circulating wave channel 50A, thereby making the microwave emitted by the microwave emitting module 20A circulate and adding up in the microwave circulating wave channel 50A. Detailed mechanism is explained as follows.

First the microwave 90 is equally divided into the forward microwave 91 and the backward microwave 92 by the first power-divider 10A. The forward microwave 91 enters the second power-divider 34A via the first port 341A and is divided into a forward microwave 91A and a forward microwave 91B. The forward microwave 91A is the microwave emitted from the third port 343A, while the forward microwave 91B is the microwave emitted from the fourth port 344A.

The forward microwave 91A is transformed to a forward microwave 91A' after passing through the second phase-shifting module 51A. The forward microwave 91A' is then equally divided into a forward microwave 91A'A and a forward microwave 91A'B after returning to the second power-divider 34A. The forward microwave 91A'A is the microwave emitted from the third port 343A, while the forward microwave 91A'B is the microwave emitted from the fourth port 344A.

When the second phase-adjusting assembly 511A of the second phase-shifting module 51A is moved to the phase-inverting position, a phase of the forward microwave 91A'B is inverted from a phase of the forward microwave 91B such that the forward microwave 91A'B and the forward microwave 91B cancel each other out, and therefore the forward microwave 91A'B is substantially prohibited from returning to the shifting wave channel 30A from the circulating wave channel 50A. Meanwhile, a phase of the forward microwave 91A'A is aligned with a phase of the forward microwave 91A such that the forward microwave 91A'A and the forward microwave 91A add together to form a bigger microwave. As a result, the forward microwave 91 is completely directed into the microwave circulating wave channel 50A by the second power-divider 34A and keeps circulating and adding up in an ideal condition.

Similarly, when the second phase-adjusting assembly 511A of the second phase-shifting module 51A is moved to the phase-inverting position, the backward microwave 92 is directed into the microwave circulating wave channel 50A based on the same mechanism. To be precise, a phase of a microwave, which enters the second power-divider 34A via the third port 343A, leaving from the first port 341A is inverted relative to a phase of another microwave, which enters the second power-divider 34A via the fourth port 344A, leaving from the first port 341A such that said two microwaves cancel each other out, and therefore the backward microwave 92 is completely directed into the microwave circulating wave channel 50A and keeps circulating and adding up in an ideal condition.

The advantage of the second driving assembly 512A of the second phase-shifting module 51A is that the object A to be heated also shifts the phases of the microwaves in the circulating wave channel 50A; that is, every time the object A to be heated is replaced to a new one, the phase-inverting position of the second phase-adjusting assembly 511A may change and needs to be adjusted. The second driving assembly 512A actively maintains the second phase-adjusting assembly 511A at the correct phase-inverting position such that microwaves are capable of adding up in the circulating wave channel 50A.

In the preferred embodiment, the second driving assembly 512A is electrically connected to the first directional coupler 24A of the microwave emitting module 20A and the second directional coupler 41A of the isolated-port load assembly 40A such that the position of the second phase-adjusting assembly 511A is controlled according to a sum of the microwave energy measured by the first directional coupler 24A and the microwave energy measured by the second directional coupler 41A. As a result, the second driving assembly 512A is capable of maintaining the second phase-adjusting assembly 511A at the phase-inverting position automatically.

To be more precise, when the second phase-adjusting assembly 511A deviates from the phase-inverting position, the forward microwave 91A'B from the fourth port 344A and the forward microwave 91B divided from the forward microwave 91 are unable to cancel each other out, and therefore some of resulting microwave either travels in reverse direction to the input port 11 and then is emitted to the water load 23, or travels to the isolated port 12 and then is emitted to the water load 42. As a result, when the second phase-adjusting assembly 511A is moved to a position where the sum of the microwave energy measured by the first directional coupler 24A and the second directional coupler 41A are at a minimal value, the second phase-adjusting assembly 511A is at the best phase-inverting position.

Figure 10:
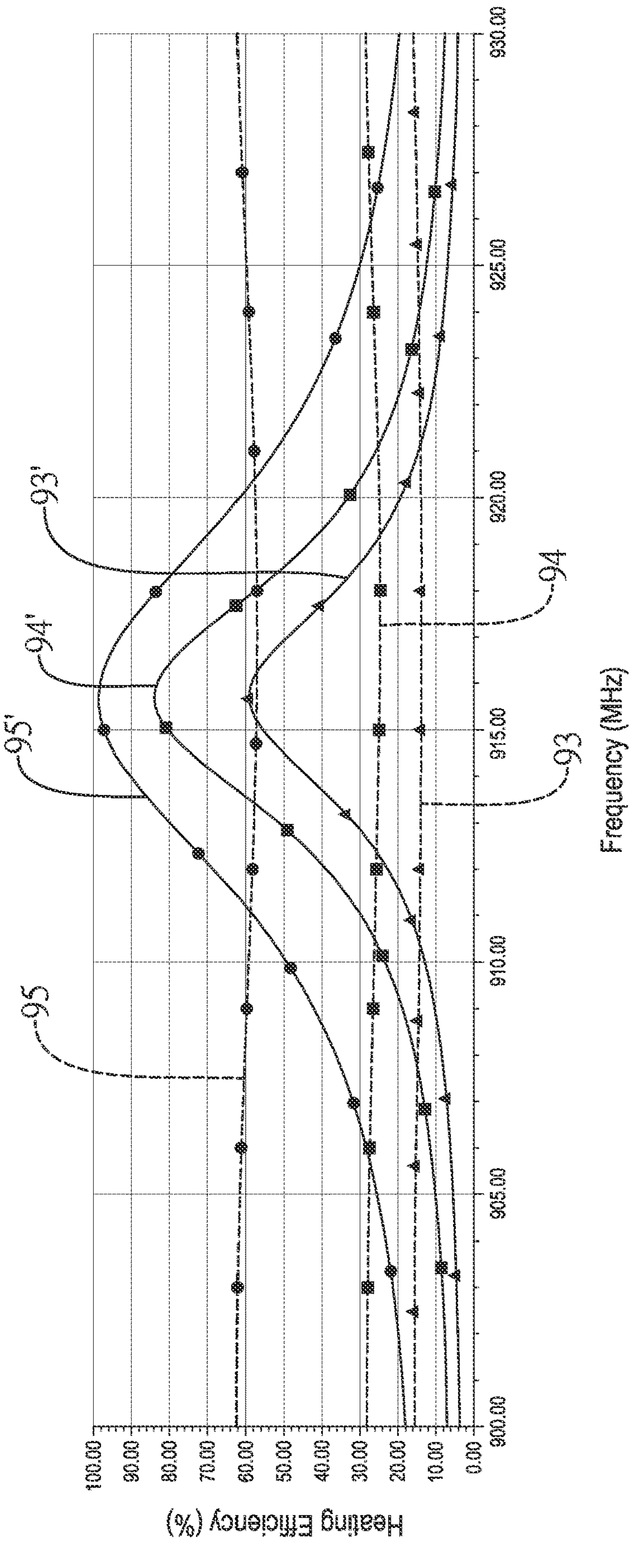
FIG. 10 is a diagram with curves showing heating efficiencies of objects to be heated with different microwave-absorbing materials versus frequency for both the first embodiment and the second embodiment.

With reference to FIG. 10, curves showing heating efficiency of heating efficiencies of objects A to be heated with different microwave-absorbing materials versus frequency are presented. Said heating efficiency is defined as the ratio of heat generated in the object by microwave.

Curve 93 shows relationship of low microwave-absorbing material versus frequency in the first embodiment. Curve 93' shows relationship of low microwave-absorbing material versus frequency in the second embodiment. When the second phase-adjusting assembly 511A in the second embodiment is moved to the phase-inverting position (corresponding to a microwave frequency around 915 MHz), heating efficiency is improved from 14% in the first embodiment to 75% in the second embodiment. As a result, the second embodiment has unexpected advantage over the first embodiment.

Similarly, Curve 94 shows relationship of medium microwave-absorbing material versus frequency in the first embodiment. Curve 94' shows relationship of medium microwave-absorbing material versus frequency in the second embodiment. Heating efficiency is improved from 25% in the first embodiment to 81% in the second embodiment.

Curve 95 shows relationship of high microwave-absorbing material versus frequency in the first embodiment. Curve 95' shows relationship of high microwave-absorbing material versus frequency in the second embodiment. Heating efficiency is improved from 56% in the first embodiment to 97% in the second embodiment.

In summary, by using the first power-divider 10 to divide the microwave emitted by the microwave emitting module 20 to two microwaves that travel toward each other to form a standing wave, and by using the first phase-shifting module 31 to shift the phase of one of said two microwaves, the positions of the crests (hot spots) of the standing wave can be moved back and forth in the shifting wave channel 30 to achieve uniform heating.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A single-source microwave heating device configured to heat up an object to be heated; the single-source microwave heating device comprising:

a first power-divider having an input port, an isolated port, and two output ports; two opposite sides of the first power-divider being respectively an input side and an output side; the input port and the isolated port being located on the input side; and the two output ports being located on the output side;

a microwave emitting module configured to emit a microwave into the first power-divider via the input port; the first power-divider dividing the microwave from the microwave emitting module between the two output ports according to a main divide ratio, and emitting the divided microwave from the two output ports; and a shifting wave channel; each of two opposite ends of the shifting wave channel connected to a respective one of the two output ports of the first power-divider, a first phase-shifting module and a second power-divider serially disposed in and along the shifting wave channel; wherein the first phase-shifting module is configured to shift a phase of a microwave passing through the first phase-shifting module; the first phase-shifting module has a first phase-adjusting assembly and a first driving assembly; a phase-shift provided by the first phase-shifting module varies according to a position of the first phase-adjusting assembly; the first driving assembly controls the position of the first phase-adjusting assembly;

the second power-divider has a first port, a second port, a third port, and a fourth port; two opposite sides of the second power-divider being respectively a first side and a second side; the first port and the second port being located on the first side; the third port and the fourth port being located on the second side;

the second power-divider dividing a microwave entering the first port according to a first divide ratio and emitting the divided microwaves from the third port and the fourth port; the second power-divider dividing a microwave entering the second port according to a second divide ratio and emitting the divided microwaves from the third port and the fourth port; the second power-divider dividing a microwave entering the third port according to a third divide ratio and emitting the divided microwaves from the first port and the second port; the second power-divider dividing a microwave entering the fourth port according to a fourth divide ratio and emitting the divided microwaves from the first port and the second port; a channel between the first port and the fourth port of the second power-divider forming a section of the shifting wave channel;

a circulating wave channel, wherein the second port and the third port of the second power-divider are connected to two opposite ends of the circulating wave channel respectively; a second phase-shifting module and a standing-wave heating chamber are serially disposed in and along the circulating wave channel; wherein the second phase-shifting module is configured to shift a phase of a microwave passing through the second phase-shifting module; the second phase-shifting module has a second phase-adjusting assembly and a second driving assembly; a phase-shift provided by the second phase-shifting module varies according to a position of the second phase-adjusting assembly; the second driving assembly controls the position of the second phase-adjusting assembly; and the standing-wave heating chamber is configured to accommodate the object to be heated;

wherein the microwaves emitted from the two output ports of the first power-divider interfere to form a standing wave in the circulating wave channel; positions of crests of the standing wave in the circulating wave channel vary according to the position of the first phase-adjusting assembly;

wherein the standing wave in the circulating wave channel is absorbed by the object to be heated in the standing-wave heating chamber to heat up the object;

wherein when the second phase-adjusting assembly of the second phase-shifting module is moved to a phase-inverting position, a phase of a microwave, which enters the second power-divider via the second port, leaving from the fourth port is inverted relative to a phase of another microwave, which enters the second power-divider via the first port, leaving from the fourth port; meanwhile a phase of a microwave, which enters the second power-divider via the third port, leaving from the first port is inverted relative to a phase of another microwave, which enters the second power-divider via the fourth port, leaving from the first port.

2. The single-source microwave heating device as claimed in claim 1, further comprising:

a first directional coupler mounted between the microwave emitting module and the input port of the first power-divider; the first directional coupler configured to measure a microwave energy leaving from the input port; and a second directional coupler mounted to the isolated port of the first power-divider and configured to measure a microwave energy leaving from the isolated port;

wherein the second driving assembly of the second phase-shifting module is electrically connected to the first directional coupler and the second directional coupler such that the position of the second phase-adjusting assembly is controlled according to a sum of the microwave energy measured by the first directional coupler and the microwave energy measured by the second directional coupler.

3. The single-source microwave heating device as claimed in claim 2, wherein the second power-divider is a 3-dB directional coupler.

4. The single-source microwave heating device as claimed in claim 2, wherein the first power-divider and the second power-divider are each a 3-dB directional coupler.

5. The single-source microwave heating device as claimed in claim 4, wherein a meandering microwave heating channel is formed in the standing-wave heating chamber.

6. The single-source microwave heating device as claimed in claim 1, wherein the second power-divider is a 3-dB directional coupler.

7. The single-source microwave heating device as claimed in claim 1, wherein the first power-divider and the second power-divider are each a 3-dB directional coupler.

8. The single-source microwave heating device as claimed in claim 1, wherein a meandering microwave heating channel is formed in the standing-wave heating chamber.

* * * * *